Patented July 2, 1940

2,206,108

UNITED STATES PATENT OFFICE 2,206,108

DYESTUFFS OF THE METHINE SERIES

Werner Müller, Cologne, and Carl Berres, Leverkusen-Wiesdorf, Germany, assignors to General Aniline & Film Corporation, a corporation of Delaware No Drawing. Application August 1, 1939, Serial No. 287,751. In Germany April 26, 1935

4 Claims. (Cl. 260—465)

The present invention relates to new dyestuffs, more particularly it relates to dyestuffs of the methine series which may be represented by the general formula:

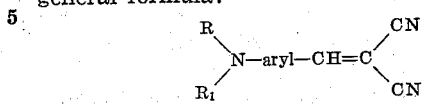

In the said formula R stands for alkyl or hydroxyalkyl, R₁ stands for hydrogen, hydroxyalkyl, alkoxyalkyl, aralkyl or aryl. The group

stands in para-position to CH.

The new dyestuffs are obtainable by condensing according to methods known per se malonitrile with a para-aminoarylaldehyde of the general formula:

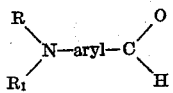

wherein R and R₁ mean the same as stated above. As far as these aldehydes are not yet known, they can be prepared e. g. according to the process described in U. S. Patent 2,141,090, or in a manner analogous to that described in British Specification No. 17,135 of 1898, or according to the method described in Berichte der Deutschen Chemischen Gesellschaft, vol. 60, p. 119.

In this manner, new and very clear basic dyestuffs are obtainable, which according to the components employed, are suited for different purposes, as for instance for coloring of solvents, for dyeing of cellulose ethers and esters.

The invention is illustrated by the following examples, without being restricted thereto, the parts being by weight:

Examples 17.9 parts of p-N-hydroxyethyl-N-methylaminobenzaldehyde and 6.6 parts of malonitrile are dissolved in 25 parts of alcohol, some drops of piperidine are added and the mixture heated for some time with reflux. When cold, the dyestuff crystallizes in yellow crystals which are sucked off and dried. The dyestuff melts at 106° C. and corresponds to the following formula:

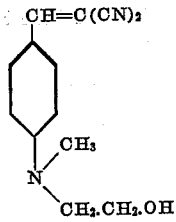

The dyestuff is but slightly soluble in hot water, easily soluble in alcohol, acetone, ethyl acetate and similar solvents. It dyes acetate artificial silk bright greenish yellow shades of good fastness to light and sublimation.

When working in the same way but replacing the above used aldehyde by other aldehydes, similar dyestuffs are obtained:

The dyestuff from p-N-hydroxyethyl-N- butylaminobenzaldehyde and malonitrile melts at 111° C. and corresponds to the following formula:

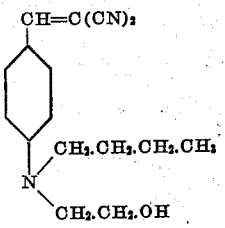

It dyes acetate artificial silk clear greenish yellow shades of likewise good fastness properties.

The dyestuff from p-N-hydroxyethyl-N-benzylaminobenzaldehyde and malonitrile dyes acetate artificial silk the same shades of the same fastness properties. It corresponds to the following formula:

The dyestuff from p-N-hydroxyethyl -N-phenylaminobenzaldehyde and malonitrile corresponds to the following formula:

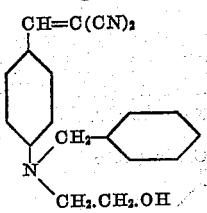

The dyestuff from p-N-hydroxyethyl-N-phenylaminobenzaldehyde and malonitrile corresponds to the following formula:

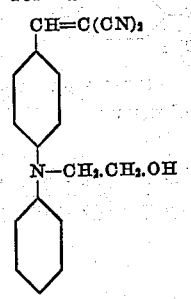

It dyes acetate artificial silk somewhat redder shades than the preceding dyestuffs. It shows very good fastness properties.

The dyestuff from p-N-hydroxyethylaminobenzaldehyde and malonitrile dyes acetate artificial silk bright yellow shades of good fastness properties. It corresponds to the following formula:

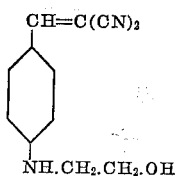

The dyestuff from p-N-ethyl-N-benzylaminobenzaldehyde and malonitrile melts at 136° C. and corresponds to the following formula:

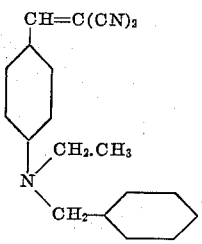

It dyes acetate artificial silk bright greenish yellow shades of good fastness properties.

The dyestuff from p-N-methyl-N-phenylaminobenzaldehyde and malonitrile dyes acetate artificial silk deep yellow shades which possess a very good dischargeability and also otherwise very good properties. It corresponds to the following formula:

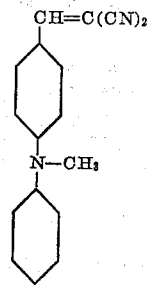

The dyestuff from p-(N-p'-ethoxyphenyl-N-methylamino)-benzaldehyde and malonitrile is easily soluble in hot alcohol, less soluble in the cold and crystallizes therefrom in light orange needles of the melting point 107°–109° C. The dyestuff corresponds to the following formula:

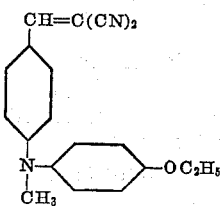

and dyes acetate artificial silk light orange yellow shades of good fastness to light and sublimation.

This application is a continuation-in-part of our copending application Serial Number 75,226 filed April 18, 1936, now Patent 2,179,895, issued Nov. 14, 1939.

We claim:

1. Dyestuffs of the general formula

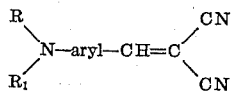

wherein R stands for a member selected from the group consisting of alkyl and hydroxyalkyl, $R_1$ stands for a member selected from the group consisting of hydrogen, hydroxyalkyl, alkoxyalkyl, aralkyl and aryl, and the group

stands in para-position to CH, yielding in general clear shades on cellulose acetate silk.

2. Dyestuffs of the general formula

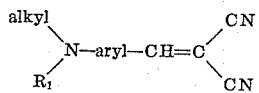

wherein $R_1$ stands for a member selected from the group consisting of hydrogen, hydroxyalkyl, alkoxyalkyl, aralkyl and aryl, and the group

stands in para-position to CH, yielding in general clear shades on cellulose acetate silk.

3. The dyestuff of the formula

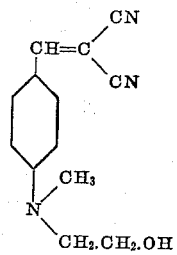

dyeing acetate artificial silk bright, greenish yellow shades of good fastness to light and sublimation.

4. The dyestuff of the formula

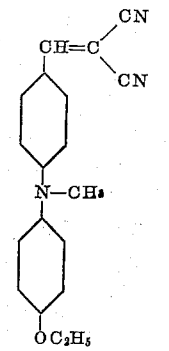

dyeing acetate artificial silk light orange yellow shades of good fastness to light and sublimation.

WERNER MÜLLER.
CARL BERRES.

CERTIFICATE OF CORRECTION.

Patent No. 2,206,108. July 2, 1940.

WERNER MÜLLER, ET AL

It is hereby certified that error appears in the printed specification of the above numbered patent requiring correction as follows: Page 1, second column, beginning with "The dyestuff" in line 28, strike out all to and including the word and colon "formula:" in line 30; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.